United States Patent [19]
Boyd

[11] Patent Number: 5,335,167
[45] Date of Patent: Aug. 2, 1994

[54] FILAMENT WINDING APPARATUS
[76] Inventor: John W. Boyd, 263 N. Palmetto, Denmark, S.C. 29042
[21] Appl. No.: 889,500
[22] Filed: May 27, 1992
[51] Int. Cl.$^5$ .................. G06F 15/46; B65H 81/00
[52] U.S. Cl. .............................. 364/167.01; 156/425; 156/446; 242/7.15; 242/7.21; 364/469
[58] Field of Search ............ 364/167.01, 469, 974.11; 156/169-175, 425-432, 446-458, 350, 351, 361; 242/7.21, 7.23, 7.02, DIG. 1, 7.14, 7.15, 7.16; 318/625, 571, 443, 444, 597, 598

[56] References Cited

U.S. PATENT DOCUMENTS

| | | | |
|---|---|---|---|
| 2,927,258 | 3/1960 | Lippel | 318/39 |
| 2,964,252 | 12/1960 | Rosenberg | 242/9 |
| 3,476,327 | 11/1969 | Vawter | 242/18 |
| 3,701,489 | 10/1972 | Goldsworthy et al. | 242/7.21 |
| 4,021,650 | 5/1977 | Ruble | 318/569 |
| 4,071,389 | 1/1978 | Ives | 156/175 |
| 4,145,740 | 3/1979 | McClean et al. | 364/469 |
| 4,242,160 | 12/1980 | Pinter et al. | 156/175 |
| 4,249,704 | 2/1981 | Sakave et al. | 156/425 X |
| 4,395,356 | 7/1983 | Slaugh et al. | 252/413 |
| 4,470,860 | 9/1984 | Gill et al. | 156/175 |
| 4,596,619 | 6/1986 | Marks | 156/171 |
| 4,671,842 | 6/1987 | Prochaska et al. | 156/425 |
| 4,874,455 | 10/1989 | Ginter | 156/425 X |
| 4,951,889 | 8/1990 | Camardella et al. | 242/7.14 X |
| 5,022,952 | 6/1991 | Vaniglia | 242/7.21 X |
| 5,055,753 | 10/1991 | Hermanson et al. | 364/474.01 X |

Primary Examiner—Joseph Ruggiero
Attorney, Agent, or Firm—Hardaway Law Firm

[57] ABSTRACT

A programmable filament winding apparatus is provided. The apparatus has a rotatable mandrel having a center rotational axis, a traverse axially movable relative to the mandrel, a filament supply, a drive associated with the traverse for movably positioning the traverse, and a winder drive unit for rotating the mandrel. In order to obtain computer control of the apparatus, a first encoder for producing a signal corresponding to rotation of the mandrel, a second encoder associated with the traverse for producing a signal corresponding to a position of the traverse as it moves along the traverse drive axial to the mandrel, and a computer including a microprocessor for receiving and processing signals from the first and second encoders and for controlling the traverse drive and rotation of the mandrel is provided. For manual control, a control panel in communication with the computer for controlling the traverse drive and rotation of the mandrel is provided. The microprocessor further includes a programmable memory for storing at least one program describing motion of the traverse drive and rotation of the mandrel. The control panel is also capable of controlling the motion of the drive independent from the motion of the mandrel. This allows for the precise winding of filament on a mandrel that has a thickness that changes.

4 Claims, 2 Drawing Sheets

FILAMENT WINDING APPARATUS

BACKGROUND OF THE INVENTION

The present invention relates to generally to filament winding apparatuses, and more particularly to a programmable filament winding apparatus and process wherein the winding of a filament can be controlled.

Various apparatuses for winding a filament exist within the prior art. Such apparatuses typically include a rotatable mandrel, means for applying a settable resin spray on the surface of the mandrel, a filament supply means for supplying filament to be applied to the surface of the mandrel and traversing means for effecting relative movement of the resin spray and the filament.

U.S. Pat. No. 4,071,389 discloses a method and apparatus for making cylindrical objects by applying resin to the surface of a mandrel and embedding stranded reinforcement in such settable resin. A resin spray nozzle is provided that can be moved toward and away from a mandrel on which the nozzle sprays resin.. The resin spray nozzle can also be swung relative to the mandrel about an upright axis or can dispense resin in a flat spray wherein the application of the flat spray to the mandrel can be altered from being parallel to the axis of the mandrel to being disposed at an angle to such axis. To control the amount of resin sprayed onto the mandrel, auxiliary means are used to move the nozzle relative to the mandrel such as moving the nozzle toward and away from the mandrel. This is in addition to the axial-traversing movement. Also, the nozzle used to apply resin can be turned about an upright axis to displace the depositing location of the resin spray axially of the mandrel, or about an axis generally parallel to the path along which resin is ejected from the nozzle in a flat fan-shaped spray to change the plane of the spray from a position generally parallel to the axis of the mandrel into a position at a substantial angle to the axis of the mandrel. A shield is utilized and is swingable either up and down or sidewise between a position offset from the path along which resin is ejected from the nozzle toward the mandrel to a position interposed between the nozzle and the mandrel for intercepting a spray of liquid from the nozzle toward the mandrel.

U.S. Pat. No. 4,145,740 discloses a filament winding apparatus utilizing a microprocessor with a software program in memory for calculating the desired movement and position of the filament head along one or more axis with respect to the rotation of the mandrel. In the preferred embodiment, the complete basic sequential movement of a filament carriage is programmed and placed in a microprocessor memory. The necessary variables for various sizes and the like may be introduced into a temporary memory for execution and an incremental encoder is appropriately coupled to the mandrel drive motor to provide a pulse output, with a predetermined and accurate number of pulses generated for each revolution of the mandrel. An absolute encoder is coupled to a servomotor which is energized to reciprocally and oppositely position the carriage and filament winding head relative to the mandrel. The processing control unit of the microprocessor reads the number of total pulses generating by the incremental encoder, and through calculation based on the gear drive systems and the like, determines the proper filament carriage position. The microprocessor reads the actual output of the absolute encoder to determine the actual carriage position. In the preferred embodiment, the carriage position is controlled by the servomotor. The microprocessor simultaneously samples the output of the incremental encoder and the absolute encoder at predetermined time intervals of the absolute encoder per sample. The signal is then modified to increase or decrease the motor speed and acceleration in accordance with actual and desired conditions. Movement of the carriage is therefore defined in terms of the incremental encoder movement which can be defined in a logical mathematical expression. The computer, it appears, therefore runs the carriage enslaved to the mandrel speed.

A method of making an elastomer lined composite vessel or portion of such vessel is disclosed in U.S. Pat. No. 4,596,619. The method comprises causing a thin, tacky ribbon comprising a elastomer to continuously encircle a center rotational axis of a mandrel so as to adjacently position and tack together integral segments of the ribbon substantially circumferentially relative to this center rotational axis, thereby forming a layer of the elastomer about the mandrel. A shell comprising filaments and thermosettable resin is applied to the layer of elastomer, and the thermosettable resin is cured to provide the vessel or portion of the vessel.

Various controlled devices or systems exist within the prior art. U.S. Pat. No. 3,476,327 discloses a method and system of numerically controlling a large multi-axis machine such as a filament winding machine wherein one axis movement consists of a large mask or moment of inertia necessitating a servo drive system of relatively low natural frequency while all the other axis movement of the machine or such as to be capable of utilizing high response drives with very high natural frequency. A system for automatically controlling the operation of a machine tool is disclosed in U.S. Pat. No. 2,927,258. Yet another control system is disclosed in U.S. Pat. No. 2,964,252 wherein an electronic control system for controlling the dependent motion responsive to the independent motion in a system wherein an independent motion and a dependent motion are a function of the independent motion.

U.S. Pat. No. 4,021,650 discloses an apparatus for generating a velocity command signal representing a predetermined optimum velocity movement of a selected one of a plurality of moveable elements from its actual position to a desired stopping position.

Despite the prior art apparatuses, room for improvement exists in the art of programmable filament winding apparatuses.

SUMMARY OF THE INVENTION

It is therefore an object of the present invention to provide an improved programmable filament winding apparatus and process.

It is another object of the present invention to provide an improved filament winding apparatus and process wherein winding can be greatly controlled.

It is yet another object of the present invention to provide an improved programmable filament winding apparatus and process which can be used to wind objects having a wide range of diameter.

It is still another object of the present invention to provide a programmable filament winding apparatus and process wherein any wind angle can quickly and easily be obtained.

These as well as other objects are accomplished by a programmable filament winding apparatus and process comprising a rotatable mandrel having a center rotational axis, traverse axially movable relative to the mandrel for positioning a filament to be applied to the mandrel and for applying a resin thereto, filament supply means, drive means associated with the traverse for movably positioning the traverse, winding means for rotating the mandrel, a first encoder for producing a signal corresponding to the rotation of the mandrel, a second encoder associated with the traverse for producing a signal corresponding to a position of the traverse as it moves along the drive means axial to the mandrel, a computer including a microprocessor for receiving and processing information from the first and second encoders and for controlling the drive means and the rotation of the mandrel, and control means in communication with the computer for controlling the drive means and the rotation of the mandrel, the microprocessor of the computer including a programmable memory for storing at least one program describing motion of the drive means and rotation of the mandrel, the control means being capable of controlling the motion of the drive means without affecting rotation of the mandrel.

DETAILED DESCRIPTION

In accordance with the present invention, it has been found that an improved programmable filament winding apparatus and process can be provided. It has also been found according to the present invention that a filament winding apparatus and process can be provided wherein winding can be greatly controlled. The filament winding apparatus and process according to this invention can be used to wind objects having a wide range of diameter and can obtain any wind angle quickly and easily. Further advantages and features will become apparent from a reading of the following description given with reference to the various figures of drawings.

Figure 1:
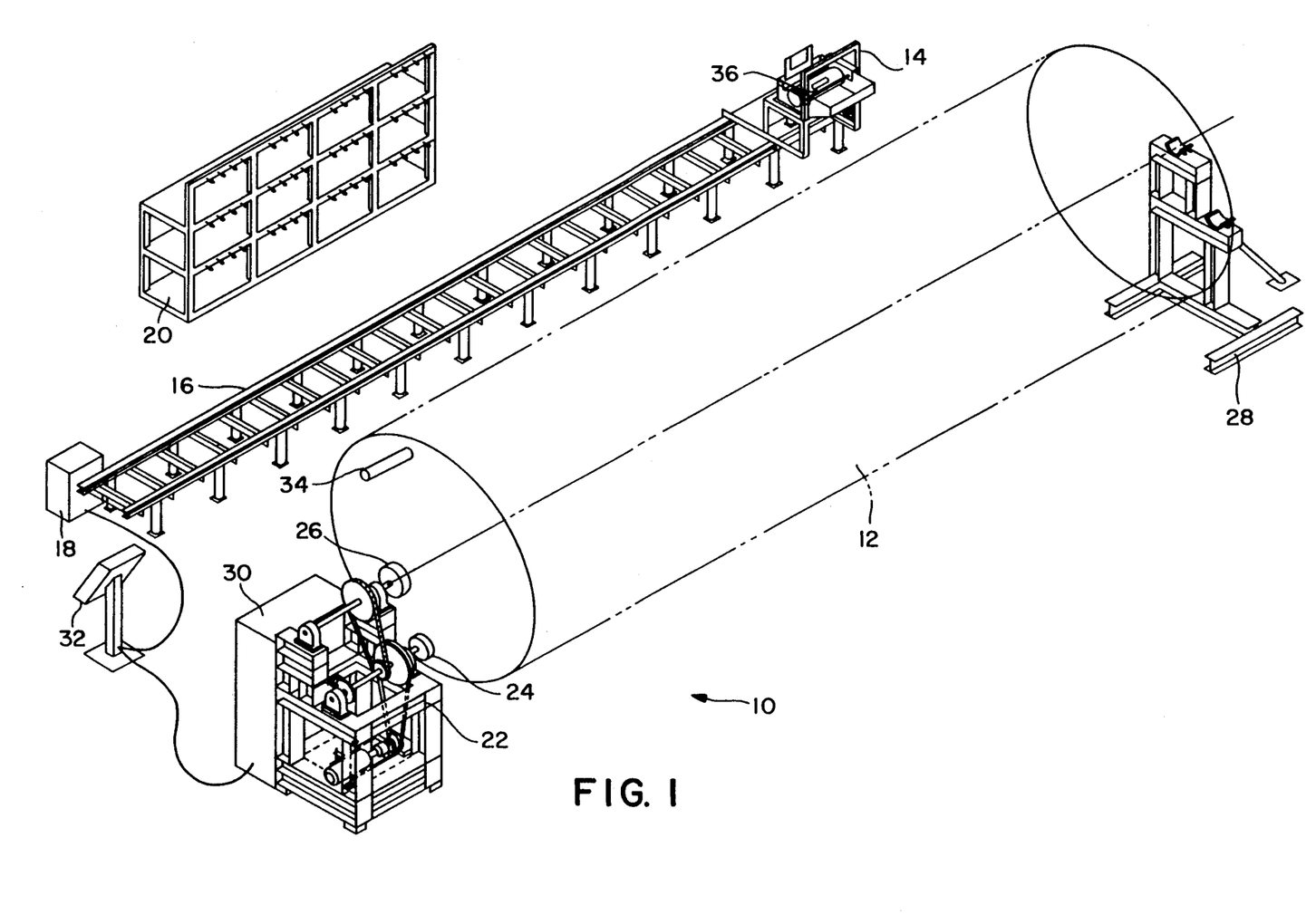
FIG. 1 of the drawings is a perspective view of a programmable filament winding apparatus according to this invention.

As illustrated in FIG. 1 of the drawings and in accordance with this invention, an improved filament winding apparatus 10 is provided. Winding apparatus 10 comprises a rotatable mandrel 12 which has a center rotational axis. A traverse 14 is axially movable relative to mandrel 12 and is adapted for positioning a filament to be applied to mandrel 12 and can be adapted to apply a resin to a filament to be wound or to mandrel 12. A drive means is associated with traverse 14 for movably positioning traverse 14 and is illustrated in the preferred embodiment in FIG. 1 as a track 16 upon which traverse 14 is slidably mounted. The drive means further comprises a drive motor 18 positioned on one end of track 16 for slidably moving traverse 14 thereon.

Filament is provided by a filament supply means which is illustrated as fiber spool rack 20 which can be used to supply a filament or a plurality of filaments through traverse 14 to mandrel 12.

In order to wind the filament around mandrel 12, a winding means is provided and is illustrated in the preferred embodiment as winder drive unit 22 in FIG. 1 of the drawings. Winder drive unit 22 includes a pair of driven rollers 24 and 26 for rotating mandrel 12 in order to wind a filament thereon. Winder drive unit 22 is illustrated as being positioned only at one end of mandrel 12, as a mandrel end support 28 is positioned at the other end of mandrel 12 in order to support mandrel 12 as it rotates.

A computer 30 is illustrated in FIG. 1 attached to winder drive unit 22 and includes a microprocessor for receiving and processing information relating to winding a filament around mandrel 12. Computer 30 is preferably a SAM-EX computer manufactured by Alan Bradley Control. A control means is illustrated as computer control panel 32 and is in communication with computer 30 for controlling traverse 14 as it moves along track 16 being driven by drive motor 18 and for controlling the rotation of mandrel 12. An operator of panel 32 can therefore program the length of a shell and the wind angle and successive identical length shells can be produced without having to reprogram the apparatus.

As utilized in U.S. Pat. No. 4,145,740, and in the preferred embodiment, winding apparatus 10 includes a first encoder 34 and a second encoder 36 that produces signals indicative of positions in order to allow a filament to properly be wound around mandrel 12. First encoder 34 is preferably coupled to mandrel 12 and is driven therewith. First encoder 34 generates a digital signal in the form of a train of pulses that directly correspond to rotation of mandrel 12. Second encoder 36 is associated with traverse 14 and generates a digital signal corresponding to the axially displaced position of traverse 14 as it moves along track 16. The signal produced by first encoder 34 is utilized, through a logical mathematical definition, to determine to the proper location of traverse 14. Utilizing the appropriate computational formula, the proper location of traverse 14 as computed can be compared with the actual location of traverse 14 which is indicated by second encoder 36. Utilizing the information generated by first and second encoders 34 and 36 in computer 30, a desired winding of a filament around mandrel 12 can be obtained. Various mathematical definitions for a winding sequence can be provided or empirically developed in order to wind a filament. Computer 30 includes a microprocessor in order to store a plurality of programs and information necessary to define and control the position of traverse 14 along track 16 and rotation of mandrel 12. A preferred program is run by computer 30 according to the Object Code attached in Appendix A. A variety of monitoring actions by computer 30 may occur during the winding of a filament, and the microprocessor can utilize this and other information to cause a filament to be predictably wound according to the programmed components.

Figure 2:
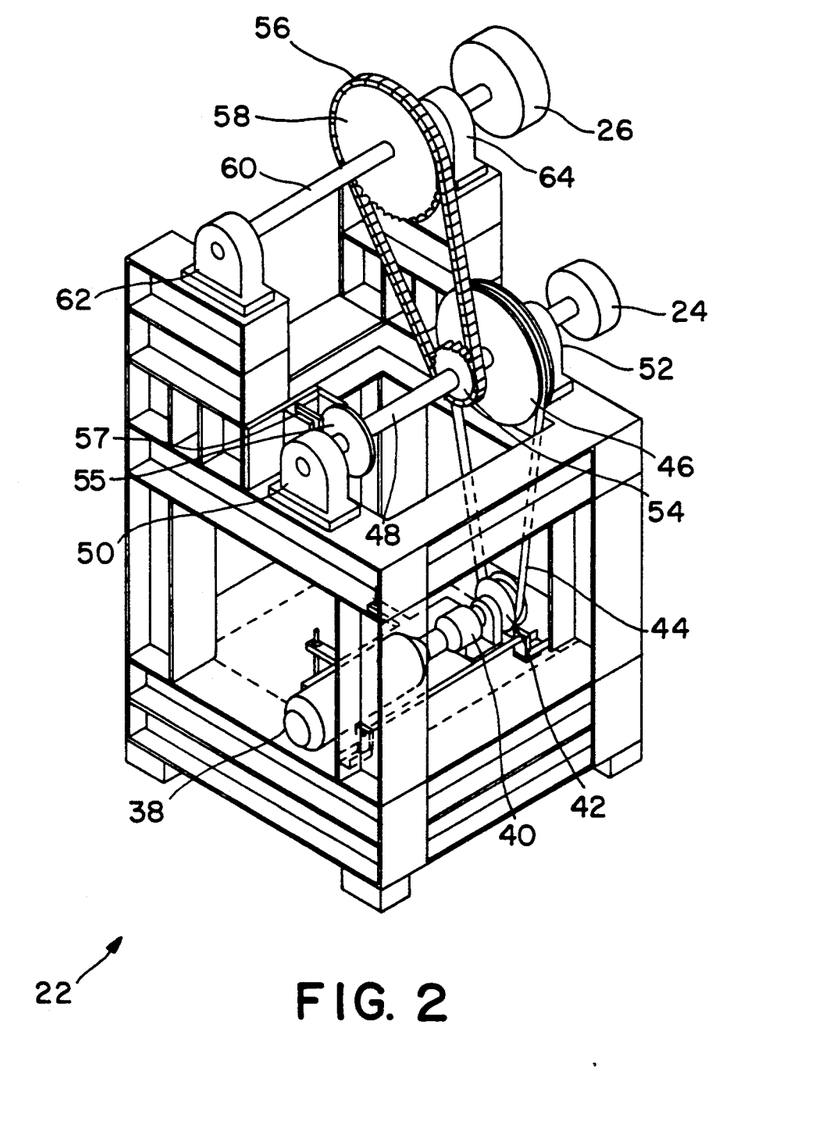
FIG. 2 of the drawings is a perspective view of a winder drive unit according to this invention.

FIG. 2 of the drawings illustrates an enlarged perspective view of winder drive unit 22. As shown, winder drive unit 22 comprises a motor 38 which through gear reduction 40 causes drive belt pulley 42 to rotate. Rotation of drive belt pulley 42 engages drive belt 44 causing it to rotate. Drive belt 44 also engages a second drive belt pulley 46 which is clearly of a larger diameter than drive belt pulley 42. Drive belt pulley 46 is mounted on a shaft 48 which extends between two bearing blocks 50 and 52 and further extends through bearing block 52 where roller 24 is mounted thereon. Also mounted on shaft 48 is drive sprocket 54 which is engaged with drive chain 56. Movement of drive belt 44 therefore rotates shaft 48 and also roller 24 and drive sprocket 54 which are thereon. A brake disc 55 is provided on shaft 48 to engage brake caliper 57 to stop rotation.

A second drive sprocket 58 is also engaged with drive chain 56 so that movement of drive chain 56 causes second drive sprocket 58 to rotate as well. Second drive sprocket 58 is mounted on shaft 60 which extends between two bearing blocks 62 and 64 and further extends through bearing block 64 where roller 26 is mounted thereon. Roller 26 rotates a mandrel at its center longitudinal axis. Rotation of shaft 48 therefore causes shaft 60 with roller 26 thereon to rotate as well.

Utilizing computer control panel 32, winding apparatus 10 can quickly and easily be instructed to produce any wind angle. The wind angle can be adjusted to any desired wind angle at any point in the programming procedure. Also, an operator can choose from zero dwell time up to a 360 degree dwell time. The winder drive unit 22 can rotate mandrel 12 in either a forward or reverse direction. Also, the speed of traverse 14 can be increased or decreased by use of computer control panel 32 without affecting speed or rotation of mandrel 12. Increasing or decreasing the speed of traverse 14 independent from rotation of mandrel 12 typically would only be done in order to change a wind angle.

As a distinctive feature of the present invention, winding apparatus 10 has the ability to jog up or back a distance to adjust the winding pattern in order to correct a leading or following pattern. This feature is basically a back-space feature, typically for use when starting a winding process again after the apparatus has been stopped in which case a gap is frequently created. Utilizing this ability to jog up or back, traverse 14 can be manually moved without stopping mandrel 12.

During actual winding, computer control panel 32 can be used to stop motion of traverse 14 at any position, reverse it and cause it to move again. This feature is quite helpful with a shell that has thicknesses that change.

The speed of traverse 14 along track 16 is variable so that various structures, from small diameter pipes to large diameter tanks, can be wound on mandrel 12. This variable speed is controllable by computer control unit 32.

It is thus seen that the present invention provides an improved programmable filament winding apparatus and process. It is also seen that the present invention provides a programmable filament winding apparatus and process wherein winding can be greatly controlled. It is further seen that the programmable filament winding apparatus and process can be used to wind objects having a wide range of diameter and allows a wind angle to quickly and easily be obtained. Many variations are apparent to those of skill in the art, and such variations are embodied within the spirit and scope of the present invention as measured by the following appended claims.

APPENDIX A

```
\******* HEADER DECLARATIONS ********
APPID="C 1991 AFC" \ 9600 BAUD
FORM [X=XXX.XX,Y=XXX.XX]
AXIS [X=LINEAR,Y=ROTARY]
DEF  V1   [F=XX.XXXX]
DEF  V2   [F=XXX.XX]
DEF  V3   [F=XXX.XX]
DEF  V4   [F=XX.X]
DEF  V5   [F=XX.XXXX]
DEF  V6   [F=XXX.XX]
DEF  V7   [F=XXX.XX]
DEF  V8   [F=XXX.XXXX]
DEF  V9   [F=XXX]
DEF  V12  [F=X]
DEF  V13  [F=XX.XXXX]
DEF  V14  [F=XXX]
DEF  V15  [F=XXX]
DEF  V16  [F=XXX]
DEF  V20  [F=XXX.XX]
DEF  V21  [F=X]
DEF  V22  [F=XXX]
DEF  V23  [F=XXX.XXXX]
DEF  V24  [F=XXX]
DEF  V25  [F=XXX.XX]
DEF  V27  [F=XX.XXXX]
DEF  V28  [F=XX.XXXX]
DEF  V29  [F=XXX.XX]
DEF  V30  [F=XX.XXXX]
DEF  V31  [F=XXX]
DEF  V32  [F=XXX]
DEF  V33  [F=XXX.XXXX]
DEF  V34  [F=XXX]
DEF  V35  [F=XXX.XXXX]
DEF  V36  [F=XXX.XX]
DEF  V37  [F=XXX.XX]
DEF  V39  [F=XXX.XXXX]
DEF  V40  [F=XXX.XX]
DEF  V41  [F=XX]
DEF  V42  [F=XXX]
DEF  V46  [F=XXX.XX]
DEF  V47  [F=XXX.XX]
DEF  V48  [F=XXX.XX]
DEF  V49  [F=XXX]
DEF  V50  [F=XXX.XX]
DEF  V51  [F=XXX.XX]
DEF  V52  [F=XXX.XX]
DEF  V53  [F=XXX.XX]
DEF  V54  [F=XXX.XX]
```

```
DEF V55 [F=XXX]
DEF V56 [F=XXX.XX]
DEF V57 [F=XX.XXXX]
DEF V58 [F=XXX.XX]
DEF V59 [F=XXX.XX]
WIDTH 40
DISP [VPX="CARR POS ",V14=" PASS "]
END HEADER
\******* APPLICATION PROGRAM *******
#1\ start prog.
DB16,1
(V5=0)
(V51=0)
(V52=0)
E1
GO
DB20,0
DB21,0
P" "
(V14=0)
?T"CHOOSE ",V12,"WIND","JOG"
?(V12=0),#2
?(V12=1),#14
>1
#2
P" "
DB21,0
?"BAND WIDTH",V1
?T"SMALL OR LARGE CHUCK ",V21,"SMALL","LARGE"
?(V21=0),#45
?(V21=1),#46
P" "
?"START POSS.",V6
?"END POSS.",V7
?"COUNTS ",V40
?"WIND ANGE ",V4
?"DIAMETER ",V8
HX
(V5=V1)
P"ENTER TO POSS. CARR."
?K1
M(V2),#20,/10
?SX0
P"PRESS CARR. START"
?I0,1
#90
P"PRESS KEY 1 JOG/2 HELIX/3 HOOP"
?(V6>(V7)),>6
?(V7>(V6)),>7
#57
HY
>58
#58
GO
?I1,1,#13
?(VPY)>(V40)),>58
:
#5
DB20,1
?I5,1,>6
?I2,1,#9
?I3,1,#11
?I1,1,#13
?(VK=49),>14
?(VK=50),>21
G+,(V13)
?(V6!<(VPX)),>5
(V14=V14+1)
#57
>6
#6
DB20,1
?I4,1,>5
?I2,1,#9
?I3,1,#11
?(VK=49),>14
?(VK=50),>21
G-,(V13)
?I1,1,#13
?(V7!>(VPX)),>6
#57
>5
#7
DB20,1
?I5,1,>8
?I2,1,#9
?I3,1,#11
```

```
?(VK=49),>14
?(VK=50),>21
G+,(V13)
?I1,1,#13
?(V7!<(VPX)),>7
#57
>8
#8
DB20,1
?I4,1,>7
?I2,1,#9
?I3,1,#11
?(VK=49),>14
?(VK=50),>21
G-,(V13)
?I1,1,#13
?(V6!>(VPX)),>8
(V14=V14-1)
#57
>7
#9
(V28=(V13)*2*8/10)
G=,(V28)
?I2,1,>9
;
#11
(V28=V13*5/10)
G=,(V28)
?I3,1,>11:;
#13
GO
?I0,0,>13:;
#14
DB20,1
GO
?I4,1,#15
?I5,1,#16
?KO
?(VK=51),>90
?(VK=50),>21
>14
#15
?I7,1,>17
>18
#16
?I7,1,>19
>20
#17
J+,@30,/20
?I4,1,>17
JO:;
#18
J+,@10,/10
?I4,1,>18
JO:;
#19
J-,@30,/20
?I5,1,>19
JO:;
#20
J-,@10,/10
?I5,1,>20
JO:;
#21
#44
?(V21=0),#48
?(V21=1),#49
(V14=0)
(V29=0)
>43
#45
(V13=(V1)*3/300)
;
#46
(V13=(V1)/300)
;
#44
?(V4=55),>22
?(V4=60),>27
?(V4=65),>32
?(V4=70),>37
?(V4=75),>42
?(V4=80),>41
>21
#22
(V9=700)
(V31=819)
```

```
;
#27
(V9=580)
(V31=866)
;
#32
(V9=470)
(V31=906)
;
#37
(V9=363)
(V31=939)
;
#41
(V9=176)
(V31=984)
;
#42
(V9=270)
(V31=965)
;
#43
DB21,0
P" "
(V47=0)
(V49=0)
M(V6),@70,/2
GO
?SX0
P"+/- KEY TO ADJ./1 JOG/2 HELIX/3 HOOP"
#50
?I1,1,#13
?(V6<(V7)),>47
?(V6>(V7)),>54
>43
#48
(V23=V8*31/10)
('V22=V23)
('V27=V9)
(V30=V27*V22/100000)
(V15=3)
;
#49
(V23=V8*31/100)
('V22=V23)
('V27=V9)
(V30=V27*V22/30000)
(V15=1)
;
#47
G+,(V30)
?I5,1,>52
DB20,1
DB21,1
?I1,1,#13
?I2,1,#91
?I3,1,#92
?(VK=49),>14
?(VK=51),>90
?(VPX!>(V7+V51)),>47
GO
?(V5=0),>52
#65
>52
#50
(V39=V5*2/3*100)
('V34=V39)
(V32=V34*100*10/V31)
('V35=V32)
(V42=(V9)/10)
('V41=V42)
(V33=V35*V42/100)
('V36=V33)
('V24=V22)
(V16=V24*100/300/V15)
(V37=V36/V16)
('V25=V37)
(V20=(300-V25))
?(V15=3),>71
?(V53>30),>51
(V25=V25/2)
?(V53<30),>82
>51
#82
(V50=V25+2*2)
?(VPY<V50)
?(VPY>V50)
```

```
(V49=1)
HY
;
#51
?(VPY!>V20),>51
HY
;
#52
G-,(V30)
DB21,1
?I4,1,>47
?(VK=45),#55
?I1,1,#13
?I2,1,#91
?I3,1,#92
?(VK=49),>14
?(VK=51),>90
?(VPX!<(V6-V52)),>52
GO
?(V5=0),>47
#50
(V14=V14+1)
>47
#53
G+,(V30)
DB21,1
?I5,1,>54
?(VK=45),#55
?I1,1,#13
?I2,1,#91
?I3,1,#92
?(VK=49),>14
?(VK=51),>90
?(VPX!>(V6+V51)),>53
GO
?(V5=0),>54
#50
(V14=V14+1)
>54
#54
G-,(V30)
?I4,1,>53
DB20,1
DB21,1
?I1,1,#13
?I2,1,#91
?I3,1,#92
?(VK=49),>14
?(VK=51),>90
?(VPX!<V7-V52),>54
GO
?(V5=0),>53
#65
>53
#55
DB20,0
DB21,0
(V58=V47)

P" "
?"BAND ADJ.",V5
?"LENTH ADJ.",V47
P"KEY 5 TO RETURN"
?(VK=53)
P"+/- KEY TO ADJ./1 JOG/2 HELIX/3 HOOP"
(V59=V47-V58)
?(V53>0),>87
?(V56>V59),>56
>87
#56
(V52=0)
(V51=V47)
(V49=0)
DB20,1
DB21,1
;
#87
(V53=V53+1)
(V52=V47)
(V51=0)
(V49=0)
DB20,1
DB21,1
;
#65
?(V15=3),>67
?(V53<21),>83
```

```
?(V49>0),>83
(V48=(VPY)+V25)
(V54=150-V48)
?(V48<150),>77
(V54=300-V48)
>80
#86
(V57=V30*100)
(/V55=V57)
(V56=V54*V55/100)
;
#80
#86
(V48=(VPY)+V25)
?(V48!<125),>80
;
#77
#86
(V48=(VPY)+V25)
?(V48<150),>77
;
#83
(V48=(VPY)-V25)
(V54=150-V48)
?(V48<150),>84
(V54=300-V48)
>85
#84
#86
(V48=(VPY)-V25)
?(V48<150),>84
;
#85
#86
(V48=(VPY)-V25)
?(V48!<125),>85
;
#67
(V25=V25)
(V48=VPY+V25)
?(V48<50),>66
?(V48<100),>68
?(V48<150),>78
?(V48<200),>69
?(V48<250),>79
?(V48<300),>70
?(V48<350),>66
#66
(V48=VPY+V25)
?(VPY<50),>66
;
#68
(V48=VPY+V25)
?(VPY<100),>68
;
#69
(V48=VPY+V25)
?(VPY<200),>69
;
#70
(V48=VPY+V25)
?(VPY>V25+1),>70
;
#71
?(VPY<100),>73
?(VPY<200),>74
?(VPY<300),>72
#72
?(VPY<1)
?(VPY>V25)
HY
;
#73
?(VPY>V25+100)
HY
;
#74
?(VPY>V25+200)
HY
;
#78
(V48=VPY+V25)
?(VPY<150),>78
;
```

```
#79
(V48=VPY+V25)
?(VPY<250),>79
;
#91
(V28=(V30)*2*8/10)
G=,(V28)
?12,1,>91
;
#92
(V28=(V30)*5/10)
G=,(V28)
?13,1,>92
;
```

That which is claimed:

1. A programmable filament winding apparatus comprising:
   - a rotatable mandrel having a center rotational axis;
   - a traverse axially movable relative to said mandrel for positioning a filament to be applied to said mandrel and for applying a resin thereto;
   - a filament supply means;
   - drive means associated with said traverse for movably positioning said traverse;
   - winding means for rotating said mandrel while filament is wound thereon;
   - a first encoder for producing a signal corresponding to rotation of said mandrel;
   - a second encoder associated with said traverse for producing a signal corresponding to a position of said traverse as it moves along said drive mans axial to said mandrel;
   - a computer including a microprocessor for receiving and processing signals from said first and second encoders and for controlling said drive means and the rotation of said mandrel;
   - control means in communication with said computer for controlling said drive means and the rotation of said mandrel;
   - said microprocessor of said computer including a programmable memory for storing at least one program describing motion of said drive means and rotation of said mandrel; and
   - said control means allowing an operator to additionally control the motion of said drive means independent from the rotation of said mandrel.

2. A programmable filament winding apparatus according to claim 1 wherein said traverse on said drive means can jog up or back a distance in order to correct a leading or following pattern.

3. A programmable filament winding apparatus according to claim 1 wherein said control means can stop said traverse at any position and cause it to move in a reverse position.

4. A programmable filament winding apparatus according to claim 1 wherein said traverse can be mutually jogged back or forward without said mandrel moving.

* * * * *